United States Patent Office 2,843,090
Patented July 15, 1958

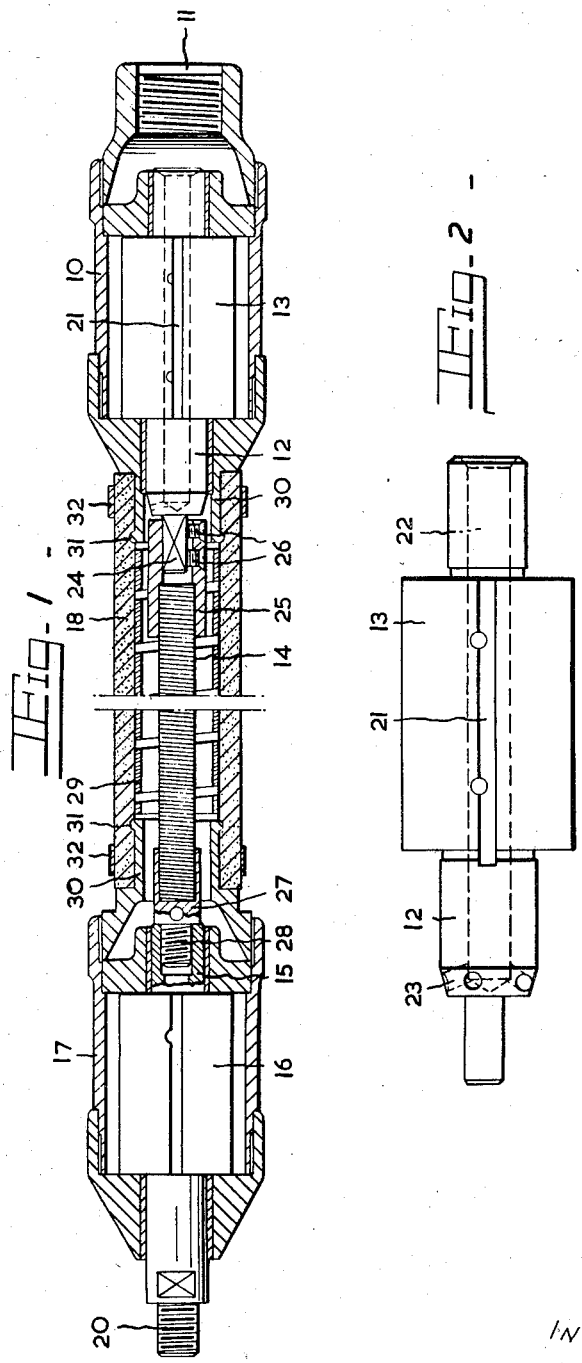

2,843,090

ROTARY FLUID PRESSURE MOTORS

Derek William Ross Walker, Barnt Green, England, assignor to Flexible Drives (Gilmans) Limited, Smethwick, England, a British company Application May 7, 1957, Serial No. 657,619

Claims priority, application Great Britain May 9, 1956

5 Claims. (Cl. 121—34)

This invention relates to improvements in rotary fluid pressure motors of the type comprising a rotor mounted in a housing or stator to which compressed air or other fluid is supplied for driving the rotor.

When such motors are used for work such as driving means for cleaning or de-scaling the inside of tubes the diameter of the motor has to be less than the internal diameter of the tube, and the power which can be developed by the motor with a given air pressure depends on the axial length of the motor. This length, however, is also limited if the equipment is to be used in curved tubes, and hence the power available for driving the cleaning or descaling means is also limited and may be insufficient for some work.

According to this invention two or more fluid pressure motors are connected in tandem by a flexible shaft enclosed in a flexible hose of substantially greater diameter than the shaft, pressure fluid being supplied through a flexible pipe to the first motor and through that motor to the flexible hose leading to the next motor and so on, and the apparatus to be driven being coupled either directly or through a flexible shaft to the output end of the spindle of the last motor.

Any desired number of fluid-pressure motors can thus be coupled together to form an assembly producing whatever power is required within an overall diameter equal to that of a single motor.

The flexible connections between the motors allow the assembly to be used in a curved tube of any radius sufficient to allow the individual motors to pass.

The driving connection between one or each end of a length of flexible shaft between two motors and the spindle of a motor may conveniently include a sliding section such as a slidably keyed spigot and socket coupling to avoid the application of axial compression or tension forces to the flexible shaft when the assembly is bent or curved.

The flexible hose connecting adjacent motors is of an internal diameter substantially greater than the diameter of the flexible shaft and is conveniently formed from rubber reinforced with fabric and strengthened internally by a liner formed by a helically wound spring steel strip.

The ends of the hose have a pressure-tight connection with the housing or stators of the motors.

One practical embodiment of this invention incorporating two fluid-pressure motors in tandem is illustrated by way of example in the accompanying drawings in which:

Figure 1 is a longitudinal section through the motors and the intermediate flexible hose and shaft.

Figure 2 is a side view on a larger scale of the rotor of the first motor.

In the arrangement illustrated 10 is a fluid pressure motor driven, for example, by compressed air which enters the rear end of the casing through an axial socket 11 adapted to receive a flexible pipe connected to a source of air under pressure.

The forward end of the spindle 12 of the rotor 13 of the motor 10 is coupled by a flexible shaft 14 to the rear end of the spindle 15 of the rotor 16 of a second fluid-pressure motor 17. The flexible shaft 14 extends axially through a flexible hose 18 which is of an internal diameter substantially greater than the diameter of the shaft and has a pressure-tight connection at each end with the casings of the motors. Compressed air for the second motor passes through the rotor of the first motor and along the hose 18 to the second motor.

The forward or output end of the spindle 15 of the second motor is screw-threaded as shown at 20 for the attachment of a descaling head or other tool to be driven. Alternatively, the tool may be coupled to the spindle 15 by a length of flexible shaft.

The motors may be of any convenient type but in the form illustrated they are of the type in which radial vanes are slidably mounted in longitudinal radial slots 21 in the rotor of which the axis is eccentric with respect to that of the housing.

In the rotor of the first motor which is shown in Figure 2 a passage 22 is drilled axially through the spindle from the rear end. The passage terminates short of the forward end of the spindle and communicates through inclined drillings 23 with the annular space between the flexible shaft and the connecting hose so that the air can flow to the second motor through that space. In an alternative construction bores for the passage of pressure fluid through the motor may be formed in the wall of the housing.

The forward end of the spindle terminates in a reduced spigot part 24 of square cross-section which is received in a socket 25 into which one end of the flexible shaft 14 is swaged or soldered or otherwise secured. The spigot 24 is drivably coupled to the socket by screws 26 which permit relative axial sliding movement between the members in order to avoid the application of axial compression or tension forces to the flexible shaft when the assembly is bent or curved.

In an alternative arrangement the spigot and socket may have a splined sliding engagement.

The forward end of the flexible shaft 14 is secured into a socket 27 having a spigot portion 28 which is screwed into an axial recess in the rear end of the spindle of the second motor.

The hose 18 is of rubber reinforced with fabric and is strengthened internally by a liner formed by a helically wound steel strip 29.

Each end of the hose fits over and is secured to the adjacent end of a motor casing. The end of the casing is provided with a hollow spigot 30 having a radially projecting annular rib 31 on its free end and the end of the hose fits over the spigot and is closed on to it by a band clip 32 or the like to make a pressure-tight connection. The clip may be replaced by a wire wound on to the hose in close turns, the end of the wire being staked or soldered to secure it.

In another arrangement the end of the hose may be received in a socket of substantial length on the end of the motor housing into which it is expanded by a coned and helically ribbed liner screwed into the end of the hose. The free end of the socket may also have an inwardly projecting annular rib engaging in an annular peripheral groove in the hose.

It will be appreciated that while an assembly comprising two motors connected in tandem has been illustrated an assembly may comprise any number of motors coupled together in line according to the power required within an assembly of given diameter.

I claim:

1. A fluid pressure motor assembly comprising a plurality of fluid pressure motors each consisting of a housing and a rotor, a flexible hose connecting the casings of adjacent motors, and a flexible shaft of a diameter less than the internal diameter of said hose drivably coupling the rotors of said motors and extending through said hose.

2. A fluid pressure motor assembly comprising a plurality of fluid pressure motors each consisting of a housing and a rotor, a flexible hose extending between the housings of adjacent motors and having pressure-tight connections therewith, a flexible shaft of a diameter less than the internal diameter of said hose drivably coupling the rotors of said motors and extending through said hose, means on the housing of the motor at one end of the assembly for receiving a flexible pipe conveying fluid under pressure, and a passage for pressure fluid extending through said motor to the hose between said motor and the next motor in the assembly.

3. A fluid pressure motor assembly comprising a plurality of fluid pressure motors arranged in line, each motor consisting of a housing and a rotor, a flexible hose extending between the casings of adjacent motors and having pressure-tight connections therewith, a flexible shaft of a diameter less than the internal diameter of said hose drivably coupling the rotors of said motors and extending through said hose, at least one end of said flexible shaft having an axially slidable driving coupling with a rotor, means on the housing of the motor at one end of the assembly for receiving a flexible pipe conveying fluid under pressure, and a passage for pressure fluid extending through said motor to the hose connecting the housing of said motor to the next motor in the assembly.

4. A fluid pressure motor assembly comprising a plurality of fluid pressure motors arranged in line, each motor consisting of a housing and a rotor, hollow spigots on the adjacent ends of the housings of adjacent motors, a flexible hose extending between adjacent motors and fitting at its ends over said spigots, means for compressing said hose on to said spigots to make pressure-tight joints, a flexible shaft of a diameter less than the internal diameter of said hose drivably coupling the rotors of said motors and extending through said hose, means on the housing of the motor at one end of the assembly for receiving a flexible pipe conveying fluid under pressure, and a passage through said motor for conveying pressure fluid to the hose leading to the next motor in the assembly.

5. A fluid pressure motor assembly comprising a plurality of fluid-pressure motors arranged in line, each motor consisting of a housing and a rotor, a flexible hose extending between the housings of adjacent motors and having fluid-tight connections therewith, a flexible shaft of a diameter less than the internal diameter of said hose drivably coupling the rotors of said motors and extending through said hose, means on the housing of the motor at one end of the assembly for receiving a flexible pipe conveying fluid under pressure, passages for pressure fluid through said end motor and any intermediate motors communicating with the flexible hoses between the motors, and means on the outer end of the rotor of the motor at the other end of the assembly for the connection of a tool to be driven.

References Cited in the file of this patent

UNITED STATES PATENTS

| | | |
|---|---|---|
| 1,313,725 | Needham | Aug. 19, 1919 |
| 2,155,205 | Rodgers | Apr. 18, 1939 |
| 2,384,872 | Baker et al. | Sept. 18, 1945 |